United States Patent
Bachelder et al.

(10) Patent No.: US 6,950,548 B1
(45) Date of Patent: Sep. 27, 2005

(54) CREATING GEOMETRIC MODEL DESCRIPTIONS FOR USE IN MACHINE VISION INSPECTION SYSTEMS

(75) Inventors: Ivan A. Bachelder, Newton, MA (US); Yun Chang, Lexington, MA (US); Yasunari Tosa, Lexington, MA (US); Venkat Gopalakrishnan, Framingham, MA (US); Raymond Fix, Natick, MA (US); Rob Milligan, Maynard, MA (US); Therese Hunt, Framingham, MA (US); Karen Roberts, Natick, MA (US)

(73) Assignee: Cognex Corporation, Natick, MA (US)

( * ) Notice: Subject to any disclaimer, the term of this patent is extended or adjusted under 35 U.S.C. 154(b) by 597 days.

(21) Appl. No.: 09/809,027

(22) Filed: Mar. 16, 2001

Related U.S. Application Data

(60) Provisional application No. 60/205,595, filed on May 17, 2000.

(51) Int. Cl.⁷ .............................................. G06K 9/00
(52) U.S. Cl. ....................... 382/145; 382/145; 382/146; 382/147; 382/151; 348/126; 250/559.34; 250/559.37
(58) Field of Search ................................ 382/141, 145, 382/147, 151, 154, 146; 700/95, 114, 118; 345/420; 348/87, 126; 702/150, 151; 250/559.34, 250/559.37

(56) References Cited

U.S. PATENT DOCUMENTS

| | | | |
|---|---|---|---|
| 4,980,971 A | 1/1991 | Bartschat et al. | |
| 5,060,276 A | 10/1991 | Morris et al. | |
| 5,113,565 A | 5/1992 | Cipolla et al. | |
| 5,226,095 A | 7/1993 | Okumura et al. | |
| 5,268,999 A | 12/1993 | Yokoyama | |
| 5,343,028 A | 8/1994 | Figarella et al. | |
| 5,371,690 A | 12/1994 | Engel et al. | |
| 5,471,541 A | 11/1995 | Burtnyk et al. | |
| 5,495,537 A | 2/1996 | Bedrosian et al. | |
| 5,497,451 A | 3/1996 | Holmes | |
| 5,500,906 A | 3/1996 | Picard et al. | |
| 5,545,887 A | 8/1996 | Smith et al. | |
| 5,602,937 A | 2/1997 | Bedrosian et al. | |
| 5,621,807 A * | 4/1997 | Eibert et al. ................. | 382/103 |
| 5,625,715 A | 4/1997 | Trew et al. | |
| 5,627,912 A | 5/1997 | Matsumoto | |
| 5,627,915 A | 5/1997 | Rosser et al. | |
| 5,663,809 A | 9/1997 | Miyaza et al. | |
| 5,828,769 A * | 10/1998 | Burns ......................... | 382/118 |

(Continued)

OTHER PUBLICATIONS

Cognex Corporation, Cognex 3000/4000/5000 Vision Tool, Revision 7.6, Chapter 4, Caliper Tool, 1996.

(Continued)

*Primary Examiner*—Bhavesh M. Mehta
*Assistant Examiner*—John Strege
(74) *Attorney, Agent, or Firm*—Russ Weinzimmer

(57) ABSTRACT

A method and system create a geometric object model for use in machine vision inspection. A pixel image representation of an object is acquired. Based on this pixel image representation, part models for the parts of the object are generated. Each part model corresponds to a different part of the object. From the part models of the object, a model for the entire object can be created. Using this created object model, a test inspection is performed on a set of test images, and each of the test images is associated with a set of known inspection measurements. The test inspection produces a set of testing inspection measurements. If the test inspection yields satisfactory performance, the object models created are stored.

24 Claims, 15 Drawing Sheets

U.S. PATENT DOCUMENTS 5,850,469 A 12/1998 Martin et al.
5,974,169 A 10/1999 Bachelder
6,084,592 A * 7/2000 Shum et al. ................ 345/420

OTHER PUBLICATIONS

Cognex Corporation, Cognex 3000/4000/5000 Vision Tool, Revision 7.6, Chapter 5, Inspection, 1996.

Cognex Corporation, Cognex 4000/5000 SMD Placement Guidance Package, User's Manual Release Mar. 8, 2000, Chapter 7, Rectilinear Device Inspection, 1998.

Cognex Corporation, Cognex 4000/5000 SMD Placement Guidance Package, User's Manual Release Mar. 8, 2000, Chapter 8, Large-Leaded Device Inspection, 1998.

Cognex Corporation, Cognex 4000/5000 SMD Placement Guidance Package, User's Manual Release Mar. 8, 2000, Chapter 15, MFOV-LL Device Inspection, 1998.

Cognex Corporation, Cognex 3000/4400 SMD Tools Release 5.2, SMD 2, 1994.

Timothy S. Newman, Anil K. Jain and H.R. Keshavan, 3D CAD-Based Inspection I: Coarse Verification, pp. 49-52, IEEE, 1992.

Anthony Hoogs and Ruzena Bajcsy, Model-based Learning of Segmentations, pp. 494-499, IEEE, 1996.

Shimon Ullman, Aligning pictorial descriptions: An approach to object recognition, COGNITION, vol. 32, No. 3, pp. 193-254, Aug. 1989.

Cognex Corporation, Cognex MVS-8000 Series, GDE User's Guide, Revision 1.1, Apr. 7, 2000.

* cited by examiner

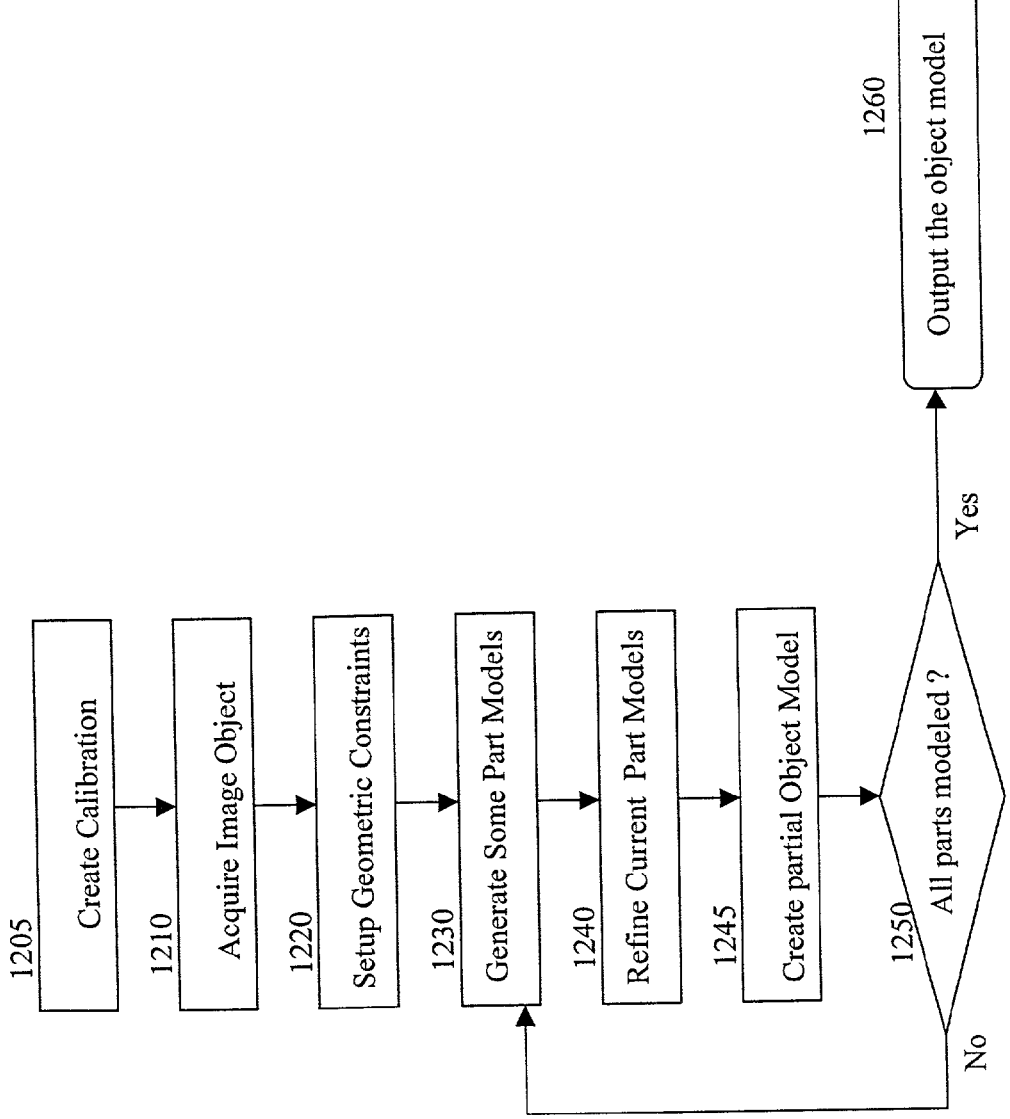

CREATING GEOMETRIC MODEL DESCRIPTIONS FOR USE IN MACHINE VISION INSPECTION SYSTEMS

PRIORITY APPLICATION DATA

Priority is claimed to Provisional Application No. 60/205,595, filed May 17, 2000, the content of which is hereby incorporated herein by reference in its entirety.

COPYRIGHT NOTICE

This patent document contains information subject to copyright protection. The copyright owner has no objection to the facsimile reproduction by anyone of the patent document or the patent disclosure, as it appears in the U.S. Patent and Trademark Patent Office files or records but otherwise reserves all copyright rights whatsoever.

BACKGROUND

1. Field of the Invention

Aspects of the present invention relate to machine vision inspection. Other aspects of the present invention relate to creating geometric object models for use in machine vision inspection systems.

2. Description of Background Information

For purposes of the disclosure contained herein, a geometric model of an object comprises parameter representations of the geometry of the object. For example, a geometric model of an object may comprise a set of geometric elements, each element comprising an arc or a line defining a substantial part of the object's geometry. Such models have many useful applications. For example, in machine vision inspection, a geometric model of an object can be compared to an object image to facilitate the alignment of the object (e.g., the precise positioning of a surface mount device (SMD) for insertion into a printed circuit board), to check if the object is within specified dimensional tolerances, and to check for other defects. If the inspected object deviates from the geometric model of the object by more than a predefined inspection threshold, that may indicate that the object is defective. Geometric models may be used in other situations. For example, they also may be used to create synthetically animated objects such as those used in video games. A geometric model can be either two dimensional or three dimensional.

In the past, geometric models of objects have been created manually. The process of manually constructing a geometric model of an object may involve entering information concerning the size, the dimension, and the shape of the object. The model may need to be refined before it is used in an inspection process. The refinement process is tedious, labor intensive, and time consuming. For an application in which the objects to be modeled change from time to time, such a manual modeling process is expensive and impractical.

There are commercial products that allow a user to create models of SMDs from their images. A user may manually place features such as corners (e.g., by moving a cursor along the edges at the corner) or leads (e.g., by manually "dragging" a cursor manipulated marquee box) on top of an image of the part to be modeled so that the shape of the parts becomes more evident in the image.

SUMMARY

An object of the invention is to provide processes and mechanisms that allow a user to generate accurate geometric models of objects. Such processes and mechanisms may be designed so that geometric models are generated directly from object images, and may be provided with features that ensure the quality of the generated models.

Methods and apparatuses may be provided for creating geometric models of objects directly from object images, and they may incorporate an effective testing phase within the model creation process to ensure the quality of the geometric models created.

BRIEF DESCRIPTION OF THE DRAWINGS

The present invention is further described in the detailed description with follows, by reference to the noted drawings by way of non-limiting exemplary embodiments, in which like reference numerals represent similar parts throughout the several views of the drawings, and wherein:

FIG. 12 is an exemplary flowchart showing another different embodiment of the process of generating a geometric model description.

DETAILED DESCRIPTION

An embodiment of the invention is illustrated that is to be used to create a geometric model of an object from one or more images of the object. The illustrated embodiment allows a user to quickly create and test geometric models using manual, graphical, and/or automatic tools. The geometric models may be used in machine vision inspection systems.

Figure 1:
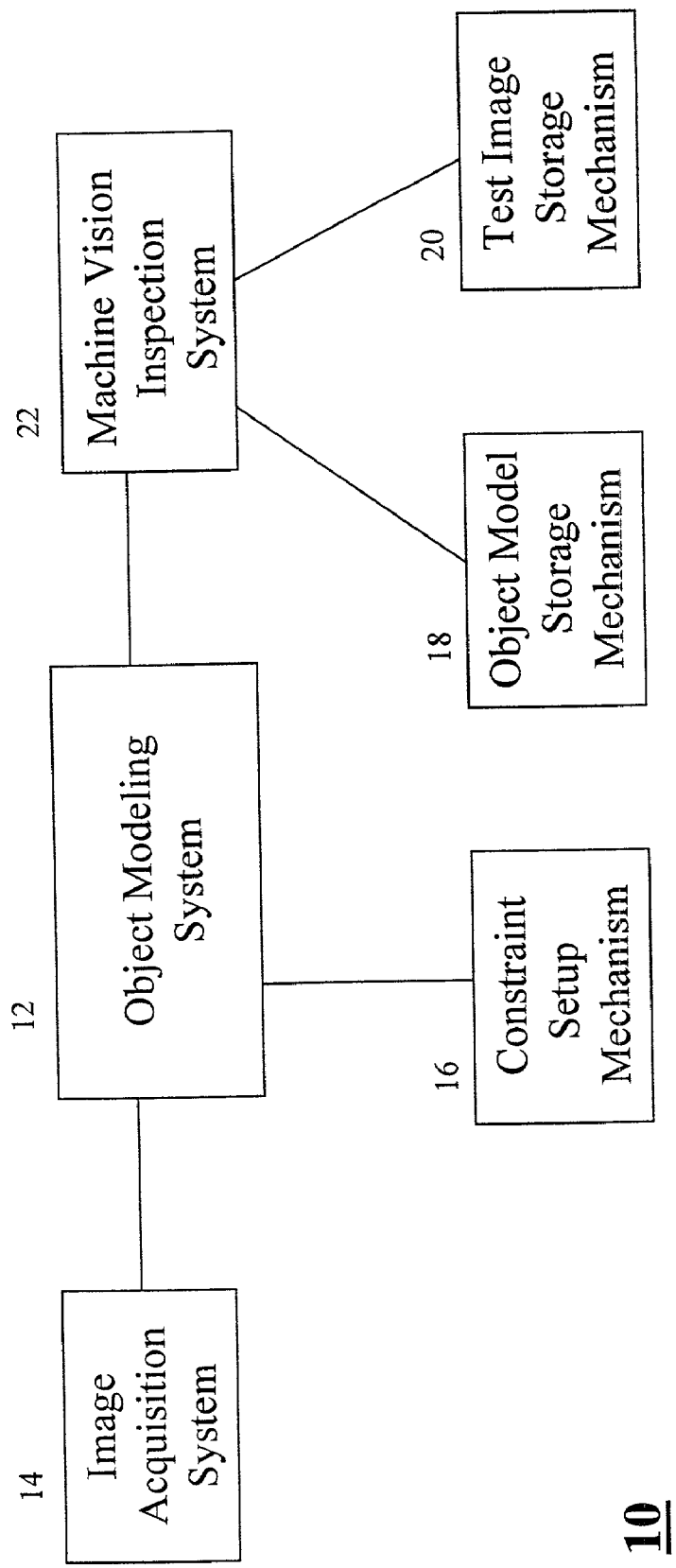
FIG. 1 illustrates a high level block diagram of the illustrated embodiment of the present invention.

FIG. 1 shows a geometric model generation system 10. The illustrated geometric model generation system 10 comprises an object modeling system 12, an image acquisition system 14, an object model storage mechanism 18, a test image storage mechanism 20, a constraint setup mechanism 16, and a machine vision inspection system 22. Image acquisition system 14, in the illustrated embodiment, may comprise, for example, a digital camera or any type of image acquisition device which will create a pixel image of an object. In addition, image acquisition system 14 may comprise a calibration unit for calibrating the image coordinate system with a physical space coordinate system.

In FIG. 1, image acquisition system 14 acquires an image of the object to be modeled. Based on the acquired object image, object modeling system 12 creates a description about the geometry of the object. The description may include information about the shape, the dimensions, and the position of the object, and information that describes spatial relationships among different parts of the object.

Figure 1A:
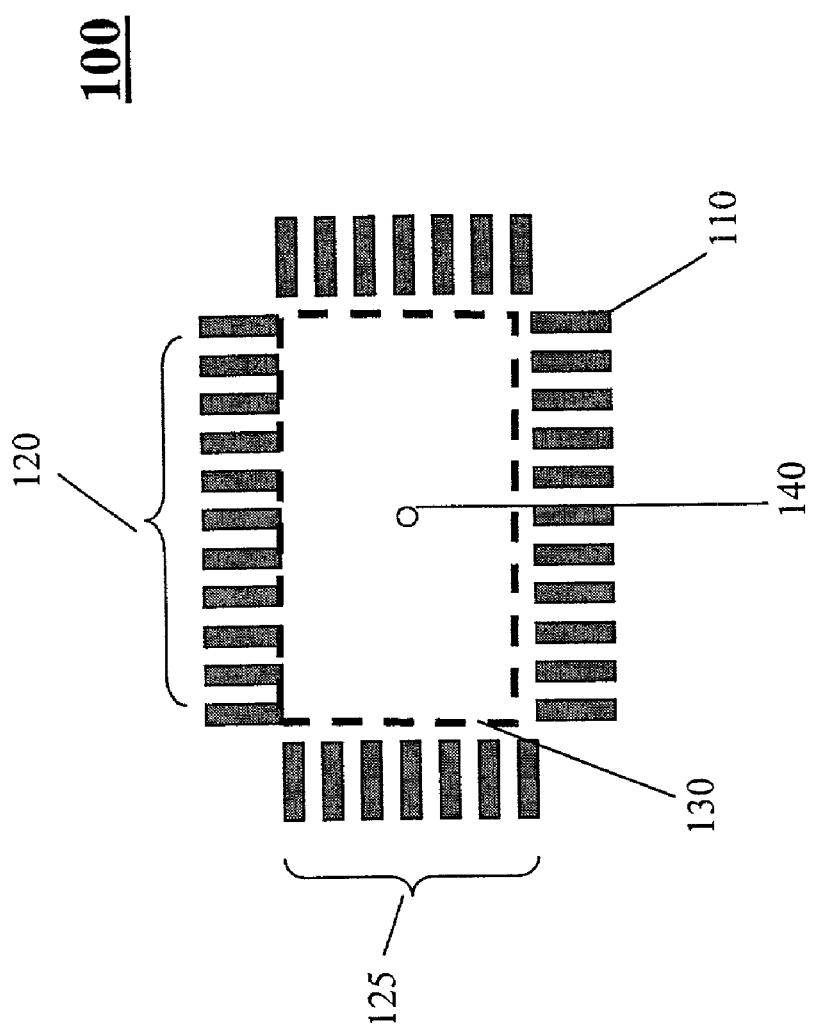
FIG. 1A shows an exemplary a surface-mount device (SMD)

This may be illustrated by an example. FIG. 1A shows an exemplary SMD 100. It is a rectangular-shaped object with certain width and height dimensions. In FIG. 1A, the width and the height of SMD 100 may be measured from rectangle 130. On each side of rectangle 130, there are a number of parts. In the illustrated SMD, each such part comprises a lead 110. Each lead is also rectangular-shaped. All the leads on one side of rectangle 130 are parallel to each other, and together they form a lead set such as 120 and 125. There are a total of four lead sets. Each occupies one side of rectangle 130. Adjacent lead sets form 90 degree angles. SMD 100 may be located at a specific position with a certain orientation in space. The position of SMD 100 may be described using center 140 of rectangle 130, expressed, for example, in horizontal and vertical coordinates with respect to a 2D coordinate system. In addition, the orientation of SMD 100 may be described by an angle with respect to, for example, the horizontal axis of the 2D coordinate system.

In FIG. 1, to assist object modeling, varieties of information may be used by object modeling system 12 to facilitate the creation of geometric model descriptions. Such information may include, for example, some sort of geometric constraints imposed on the shape of an object. Such information may be provided by a constraint setup mechanism 16. When certain constraints are specified and fed to object modeling system 12, the performance of object modeling system 12 may be enhanced. For example, if the shape of the object to be modeled is known to be a rectangle, object modeling system 12 may be constrained to allow the creation of only a rectangular geometric model or of only rectangular parts that together form the object. If such a constraint is fed to object modeling system 12, it can focus its processing only on rectangular-shaped objects. Another possible geometric constraint includes the spatial relationship among different parts of an object. For example, the four lead sets of a SMD are placed only at angles that are multiples of 90 degrees with respect to each other (as illustrated in FIG. 1A). The geometric constraints fed into object modeling system 12 from constraint setup mechanism 16 may be used to limit the operating parameters employed by object modeling system 12, and subsequently may reduce the search space for object modeling system 12, and hence speed up the modeling process.

Once a geometric description for an object is generated, object modeling system 12 activates a machine vision inspection system 22 to test the quality of the generated geometric description (i.e., the object model). The object models are stored in object model storage mechanism 18. The testing is performed by machine vision inspection system 22 on one or more test images retrieved from a test image storage mechanism 20. The test images that are used for testing an object model for a particular object are the images of the object. Based on the geometric description for the object, generated by object modeling system 12, a machine vision inspection tool may be configured, in machine vision inspection system 22, and then be used to perform machine vision inspection on the test images that represent the object.

Each test image may associate with some known inspection measurements. The inspection, performed by machine vision inspection system 22 on the test images of the object, produces inspection results. Expected inspection results are retrieved from test image storage mechanism 20, and they are compared with the actual inspection results produced by machine vision inspection system 22. The extent to which the expected results match the actual results is indicative of the quality of the geometric description of an object, generated by object modeling system 12. If the discrepancy between the known and the corresponding actual inspection results is with acceptable limits, the geometric description may be considered as satisfactory. Object modeling system 12 may iteratively refine the object model until it is assessed as satisfactory in the testing phase.

Testing image storage mechanism 20 may include, for example, a database, a medium (such as hard disk) management system, and a search engine for retrieving the information stored in the database. The test images and their associated information may be stored on such medium that random access is possible. Such medium may include, e.g., hard disk, computer memories, or CD-ROM.

Similarly, object model storage mechanism 18 may include, for example, a database, a medium (such as hard disk) management system, and a search engine for retrieving the information stored in the database. The test images and their associated information may be stored on such medium that random access is possible. Such medium may include hard disk, computer memories, or CD-ROM. Mechanisms 18 and 20 may or may not reside at a same physical location.

Figure 2:
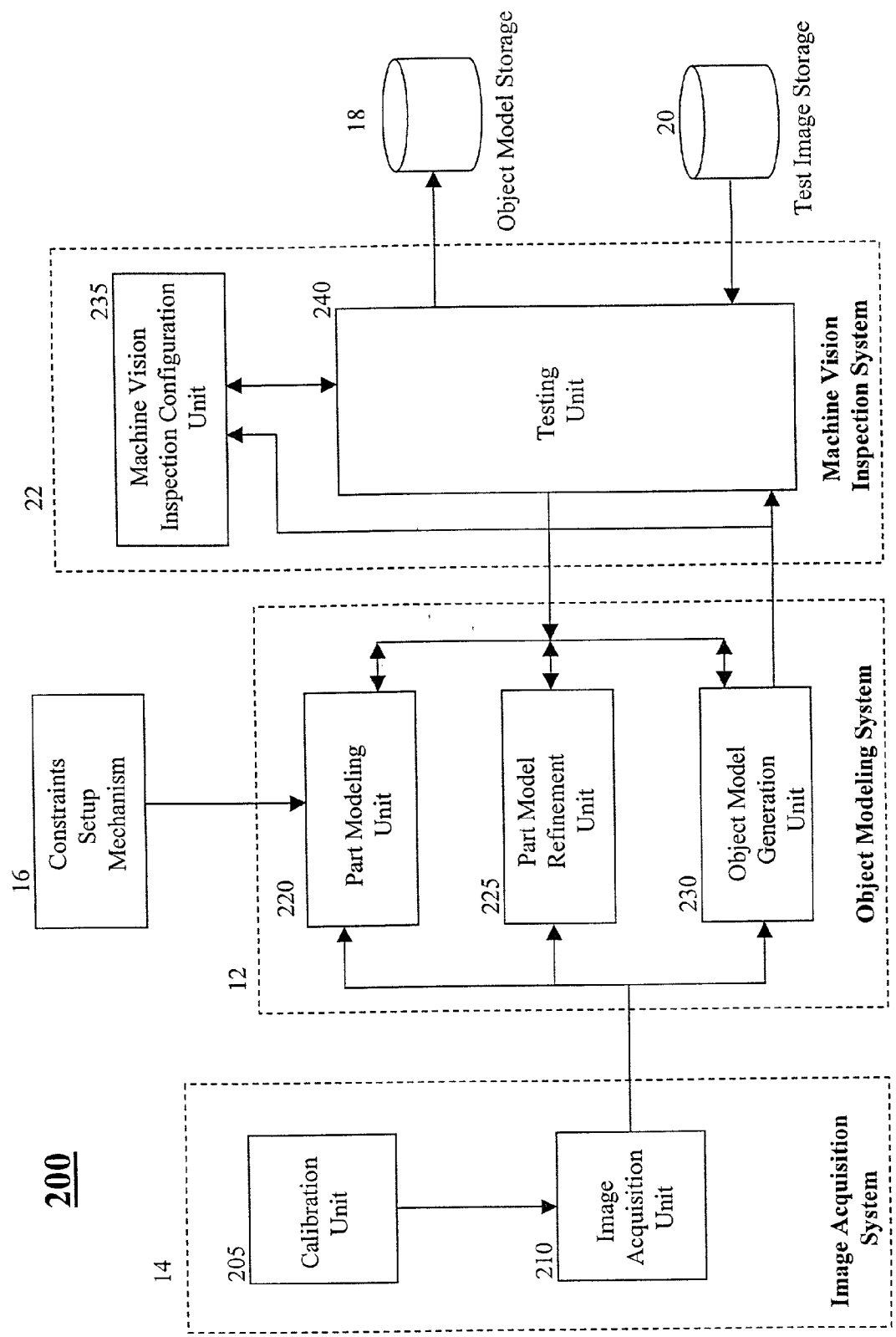
FIG. 2 illustrates a more detailed block diagram of the illustrated embodiment, in which different system components are shown.

FIG. 2 illustrates a more detailed configuration of system 10. In FIG. 2, image acquisition system 14, comprises, for example, two components: a calibration unit 205 and an image acquisition unit 210. Prior to acquiring an input image, calibration unit 205 is activated that calibrates the relationship between an image coordinate system, used by image acquisition unit 210, and a coordinate system of a physical space which the object to be modeled occupies. When such relationship is made explicit through calibration, the physical dimensions of an object can be measured from an image of the object. There are different ways to automatically calibrate image acquisition unit 210. Some involve measuring a square plate with known dimensions. This is accomplished by measuring some points on the square using a set of caliper tools and then deducing from these points the angle, the center, the length, and the width of the square. There are also manual methods to calibrate, including manually setting the calibration parameters if such parameters are known or simply importing the calibration parameters from, for example, a database.

The calibrated input image of an object, acquired by the image acquisition unit 210, is fed into object modeling system 12 which comprises, as illustrated in FIG. 2, three components: a part modeling unit 220, a part model refinement unit 225, and an object model generation unit 230. Based on an input image, part modeling unit 220 first generates the models for different parts of the object. At this point, certain geometric constraints may be fed to part modeling unit 220, from constraints setup unit 16. The part models, generated by part modeling unit 220, may be refined by part model refinement unit 225. When all the part models are generated and refined, they are fed into object model generation unit 230 where part models will be combined to create a model for the whole object.

There may be different types of interactions between part modeling unit 220 and part model refinement unit 225. For example, referring back to FIG. 1A, the leads on one side of the SMD object 100 may be modeled first by part modeling unit 220. The lead models corresponding to the parts on the first side of the SMD may be refined in part model refinement unit 225 before the lead models for the leads from a second side of the SMD object are generated. The iteration between unit 220 and unit 225 continues until all the parts of the object are modeled and refined.

Another alternative is to generate the models for the leads from all four sides of SMD 100 before refining them all at once. Yet another alternative is not to apply refinement to the part models generated. In this case, object model generation unit 230 is invoked immediately after the part models are generated at part modeling unit 220.

The object model generation unit 230 takes a set of part models as input and creates a geometric description for the entire object. As mentioned earlier, such description may include the information about the dimension and the position of the object as well as the spatial relationships among different parts of the object. Using SMD 100, illustrated in FIG. 1A, as an example, a geometric description about SMD 100 may include its width, its height, its center of mass (center point 140 in FIG. 1A), its orientation, the number of leads on each side, the dimension and position of each such lead, the spatial relationships among different leads in each lead set (e.g., parallel to each other), as well as the spatial relationship among different lead sets (e.g., adjacent lead sets form 90 degree angles).

Based on the geometric description or the object model created by object model generation unit 230, machine vision inspection system 22 performs testing inspection on test images of the object to assess the quality of the object model. In FIG. 2, machine vision inspection system 22 comprises two components: a machine vision inspection configuration unit 235 and a testing unit 240. Taking the object model created by object model generation unit 230 as input, machine vision inspection configuration unit 235 configures an inspection tool based on the object model. Configuring an inspection pertains to setting up a machine vision tool for an object that has been modeled. This includes determining the parameters that may need to be specified for an inspection tool. The object model that is subject to the testing is typically used in conjunction with the parameters in order to train an inspection tool.

A configured inspection tool is applied, by testing unit 240, to one or more test images, retrieved from testing image storage mechanism 20. Each test image represents the object whose model is being tested. In addition, each test image is associated with some known inspection measurements, retrieved, together with the test images, from testing image storage mechanism 20.

The known inspection measurements associated with each test image provide a ground truth for an inspection tool. The ground truth indicates what should be detected, based on the inspection on the image, by an inspection tool. Testing unit 240 performs testing inspection by applying the inspection tool, configured by machine vision inspection configuration unit 235, on one or more test images, retrieved from testing image storage mechanism 20. The inspection tool produces testing inspection measurements that correspond to the ground truth (or known inspection measurements). Such measurements may be as simple as whether a test image passes or fails the inspection or as complex as statistics about the accuracy, the robustness, and the time of the test inspection. The two sets of measurements (ground truth and the testing inspection measurements) may then be compared to see whether the test inspection yields similar inspection measurements as what is expected from the ground truth.

The discrepancy between the two sets of measurements may be examined. If the discrepancy is small, the object model is considered to be satisfactory. If the discrepancy is substantially large, further analysis may be performed to pinpoint the cause. There may be different reasons for a large difference in two sets of measurements. For example, imprecise part models, generated by part modeling unit 220, may produce inaccurate object model and subsequently cause wrong testing inspection measurements. Once the cause is identified, certain acts, such as part model generation and all the acts following it, may be repeated, to improve the testing inspection performance.

Determining which act or acts to iterate depends on the testing inspection results produced by testing unit 230. It is possible to return back to machine vision inspection configuration so that inspection parameters can be configured more precisely. It is also possible to return to object modeling unit 230 to create an improved model for the overall object. It is also possible to return to as early as part modeling unit 220 to model some of the parts of the object if the analysis on the testing inspection results indicates that there are some missing part models. It is of course also possible to return to part mode refinement unit 225 if the analysis on the testing inspection results indicates that some part models are not accurate enough. Details to decide how to iterate is discussed later, referring to FIG. 9.

When the two sets of inspection measurements are similar enough, the object model under testing is considered satisfactory. It may take several iterations of creating→configuration→testing, as described above, before a satisfactory geometric model for an object can be obtained. The satisfactory object model, once obtained, is stored in object model storage mechanism 18 for future inspection use.

The embodiment 200 of the present invention, illustrated in FIG. 2, generates an object model first by creating the models for different parts of the object, second by combining the part models to generate a model for the entire object, and third by incorporating a testing phase to ensure the quality of the generated object model before the model is used. System 200 may be realized based on a combination of, for example, manual, graphical, and automated tools.

Figure 3:
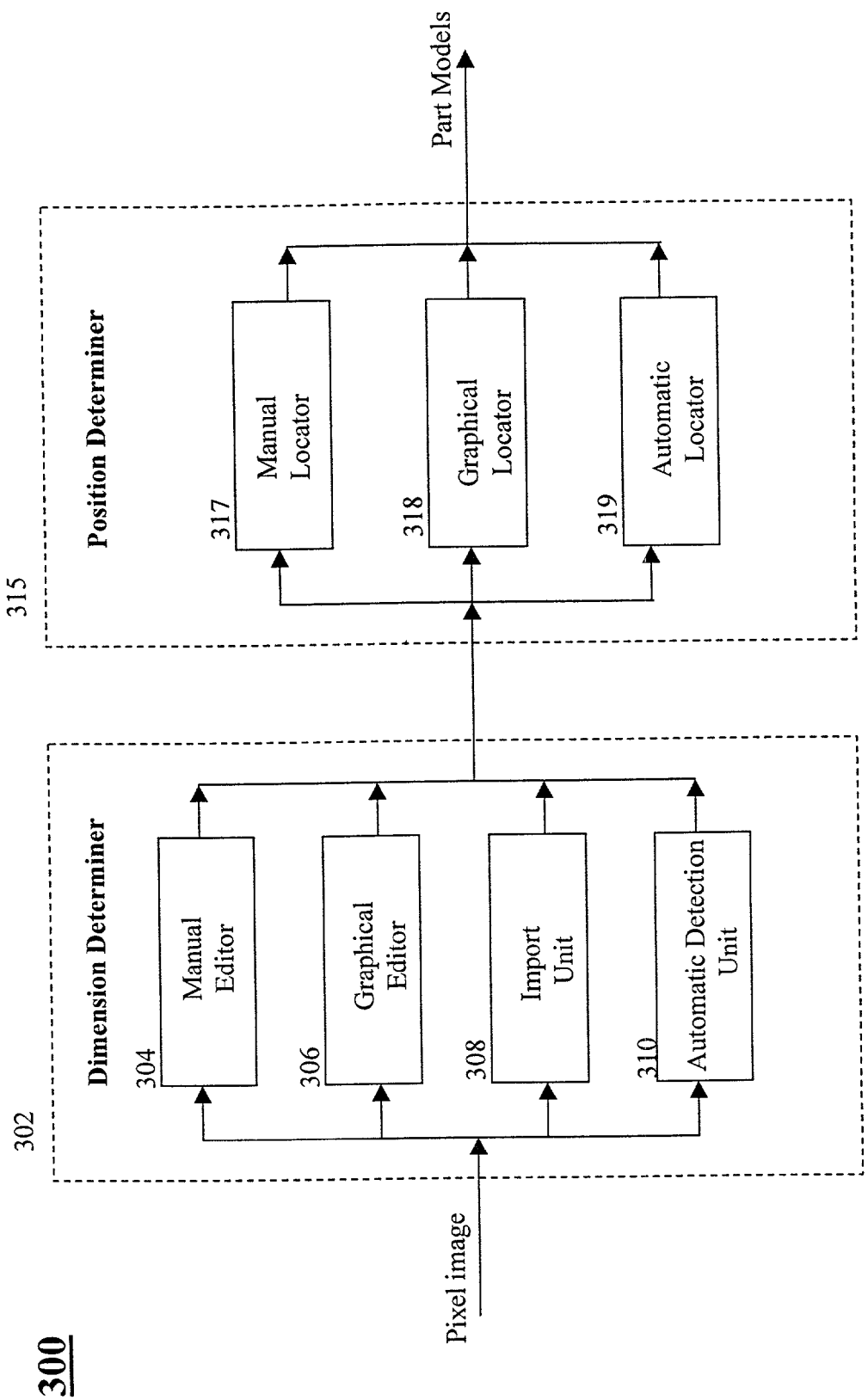
FIG. 3 is a high level block diagram of a part modeling unit.

FIG. 3 presents a high level block diagram of part modeling unit 220. It includes a dimension determiner 302 and a position determiner 315. Each may be implemented using a combination of manual, graphical, and automatic tools. For example, dimension determiner 302 comprises a manual editor 304, a graphical editor 306, an import unit 308, and an automatic detection unit 310. Similarly, position determiner 315 comprises a manual locator 317, a graphical locator 318, and an automatic locator 319.

As described earlier, creating a part model may include generating the description about the dimension (e.g., shape and size) and the position of the part (e.g., location and orientation). Descriptions about each (dimension or position) may be generated independently using different tools. For example, a user may manually enter the dimension information through a dialog box about a part and then use an automatic tool to determine the position of the part. In this case, manual editor 304 is first invoked to accept the dimension information manually entered by the user. Then the automatic locator 319 is invoked that searches the location of the part that has the given dimension in an image of the object. It is also possible that a user may draw, on a graphical editor, an object part (e.g., a rectangle) from which the shape and the size of the part may be determined and then enter the coordinate (e.g., the x and y coordinates in an image plane) of the center of the part and the orientation (e.g., the angle with respect to the X axis of the image plane) of the part. In this case, graphical editor 306 is first applied and then the manual locator 317 is applied.

Figure 4A:
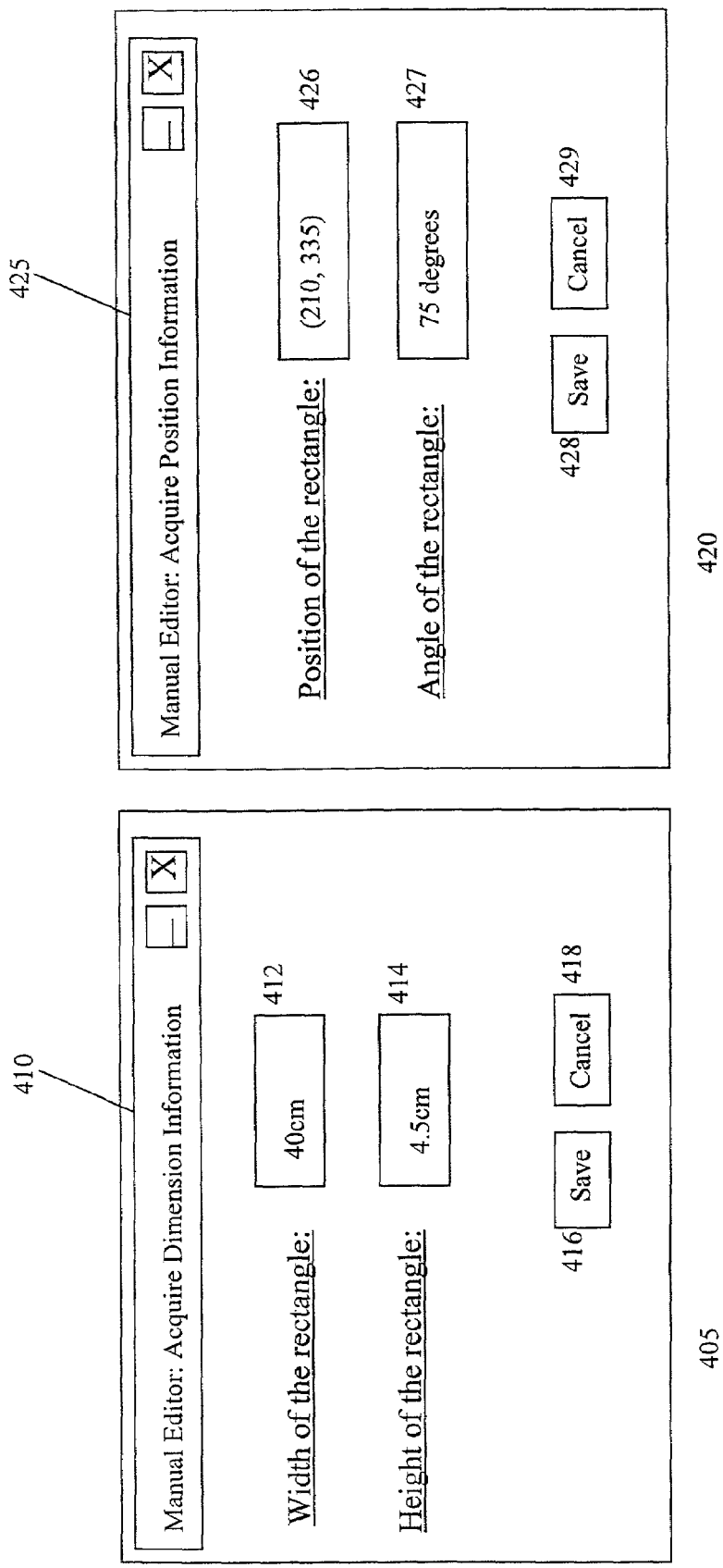
FIG. 4A illustrates exemplary manual editors.

FIG. 4A shows exemplary interfaces 405 and 420 for manual editor 304. Interface 405 is for acquiring the dimension information, manually entered by a user, about a rectangular-shaped object part. Interface 420 is for acquiring the position information, also manually entered by a user, about a rectangular-shaped object part. On top of the exemplary interface 405, window 410 may display a message indicating that it is a manual editor for acquiring dimension information. Interface 405 may further provide two edit boxes 412 and 414 that allow a user to manually enter the width and the height of a rectangle. Button 416 allows a user to save the entered dimension information. Button 418 allows a user to cancel the action, should the user changes his/her mind. Similarly, window 425 may display a message indicating that the corresponding interface is a manual editor for acquiring position information. Interface 420 may include two edit boxes 426 and 427, through which a user can manually enter the coordinates of the center of a rectangle as well as the orientation of the rectangle, respectively. Button 428 allows a user to save the entered information and button 429 lets a user to cancel the manually entered information.

Figure 4B:
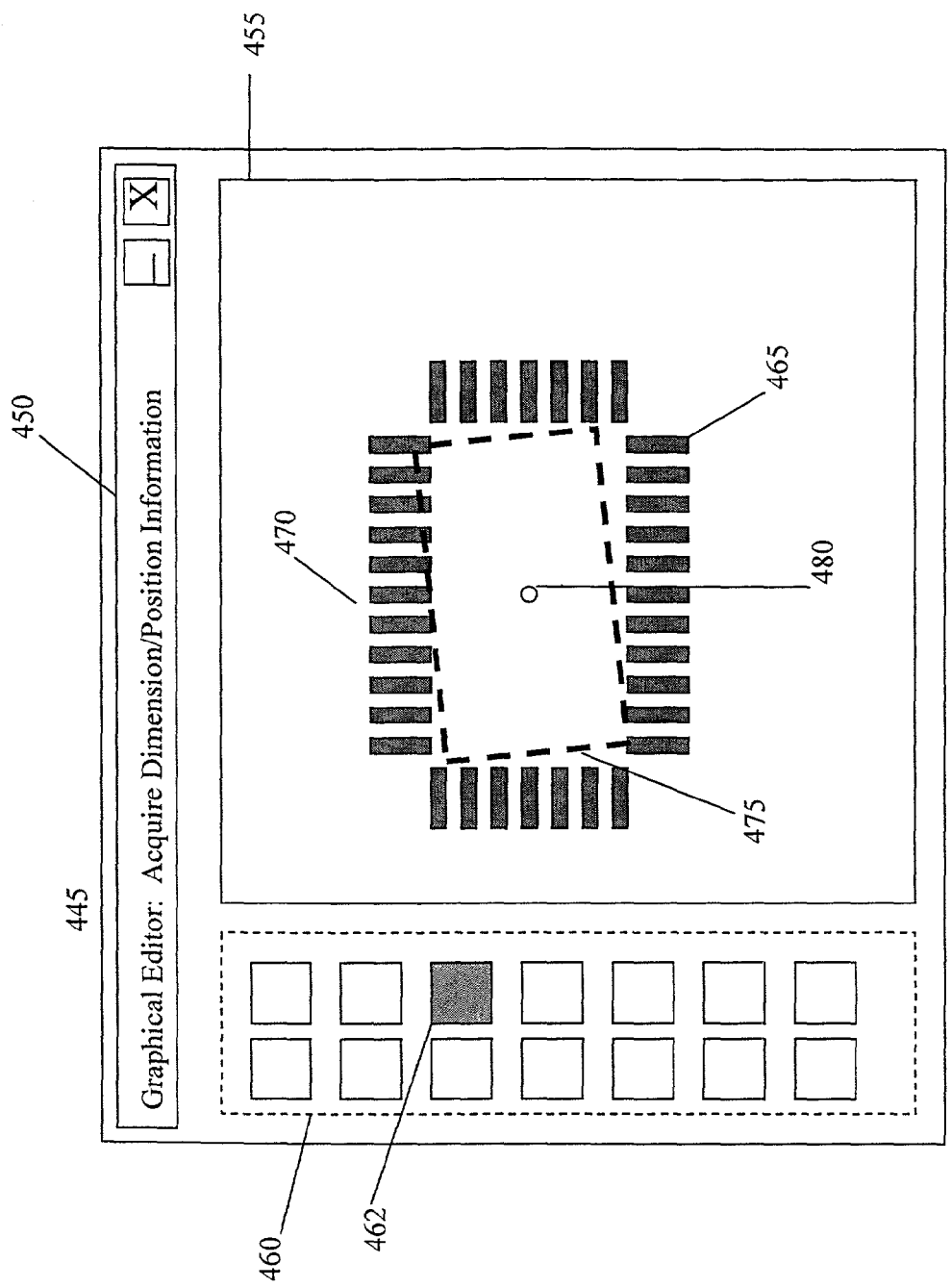
FIG. 4B illustrates exemplary graphical editors.

FIG. 4B shows an exemplary interface 445 for graphical editor 306. Window 450 displays a message indicating that interface 445 is for a graphical editor and is to be used to acquire dimension and position information of an object part. Interface 445 allows a user to draw a part directly on top of the image of the part. This may be accomplished through display window 455, where the image of the object to be modeled can be rendered and drawings can be made on top of the image. A drawing tool section 460 may include a set of buttons, each representing a particular drawing tool. A drawing tool may be chosen by a user, by simply clicking on the button that represents the drawing tool, and then used to make drawings on top of the image displayed in display window 455. For example, button 462 may represent a drawing tool that allows a user to draw a rectangle on display window 455.

In the illustration in FIG. 4B, there is an exemplary SMD 470 displayed in display window 455. The SMD has different parts, each and shaped like a rectangle. For instance, lead 465 is a part of SMD 470. To specify the dimension information about SMD 470 through drawing, on top of an image of SMD 470 displayed in window 445, a user may first choose a rectangular drawing tool, by clicking on button 462, and then draw a rectangle in display window 455. Rectangle 475 is an exemplary rectangle drawn by a user. A drawing, in this particular context, is usually drawn in such a manner that it is as closely aligned with the object to be modeled, displayed in an image in window 455, as possible. When a drawing, such as rectangle 475, is not aligned precisely with the object in the image, displayed in window 445, refinement may be necessary. The refinement details will be discussed in referring to FIGS. 5, 6A, and 6B.

From rectangle 475, drawn by a user in display window 455, both dimension and position information can be extracted. First of all, by choosing a rectangular drawing tool, it indicates that the object part is a rectangle. The width, the height, the location, and the orientation of the rectangle may be computed directly from the drawing. For example, center 480 of rectangle 475 represents the center or the location of SMD 470.

Dimension and position information may also be obtained through other means. For example, import unit 308 in FIG. 3 may allow a user to load or import the dimension information about a part, if such information is available. The imported information may be encoded in different formats such as CAD format. It is also possible that the imported information is stored elsewhere with some storage mechanism, such as a database, on some medium, such as a hard disk or a CD-ROM. Once dimension information is imported, position information may be obtained by applying one of manual, graphical, or automatic tools.

Yet another approach to obtain dimension and position information is to apply an intelligent tool that automatically identifies the location of the part in the image and then computes the dimension and the position of the part automatically. Examples of such automatic tools are described in two commonly-assigned patent applications, "Methods and Apparatuses for Determining the Orientation of at Least One Object in An Image" (provisional application Ser. No. 60/147,721), herein incorporated by reference in its entirety, and "Methods and Apparatuses for Verifying Presence and Absence of Features Within An Image" (provisional application Ser. No. 60/141,442), herein incorporated by reference in its entirety. Such an automatic tool may be applied within a particular region of interest (ROI) in the input image, specified by drawing the ROI manually.

Figure 5:
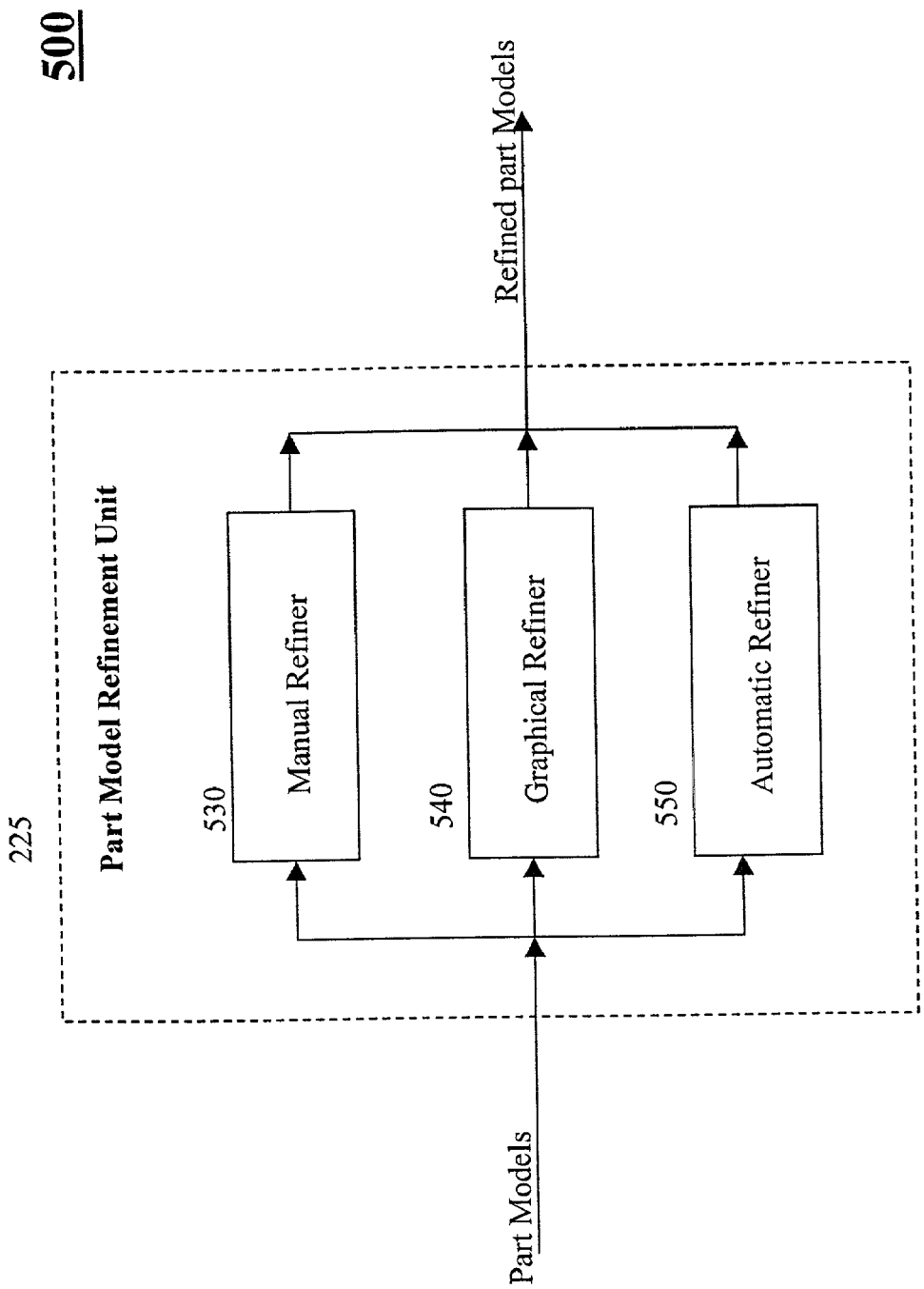
FIG. 5 is a high level block diagram of a part model refiner.

A part model generated by part modeling unit 220 may not be accurate enough. In this case, it is possible to feed the part models generated by unit 220 to part model refinement unit 225 to obtain refined or improved part models (although refinement may be a typical step, it does not have to be applied). As indicated earlier, a drawing made on top of an image of the object to be modeled may not coincide with the object precisely. In this case, the part model generated using the drawing may need to be refined. FIG. 5 presents a high level block diagram of part model refinement unit 225. In FIG. 5, a part model may be refined by using one of three exemplary approaches. One is a manual refiner 530. One is a graphical refiner 540. Yet another is an automatic refiner 550.

Figure 6A:
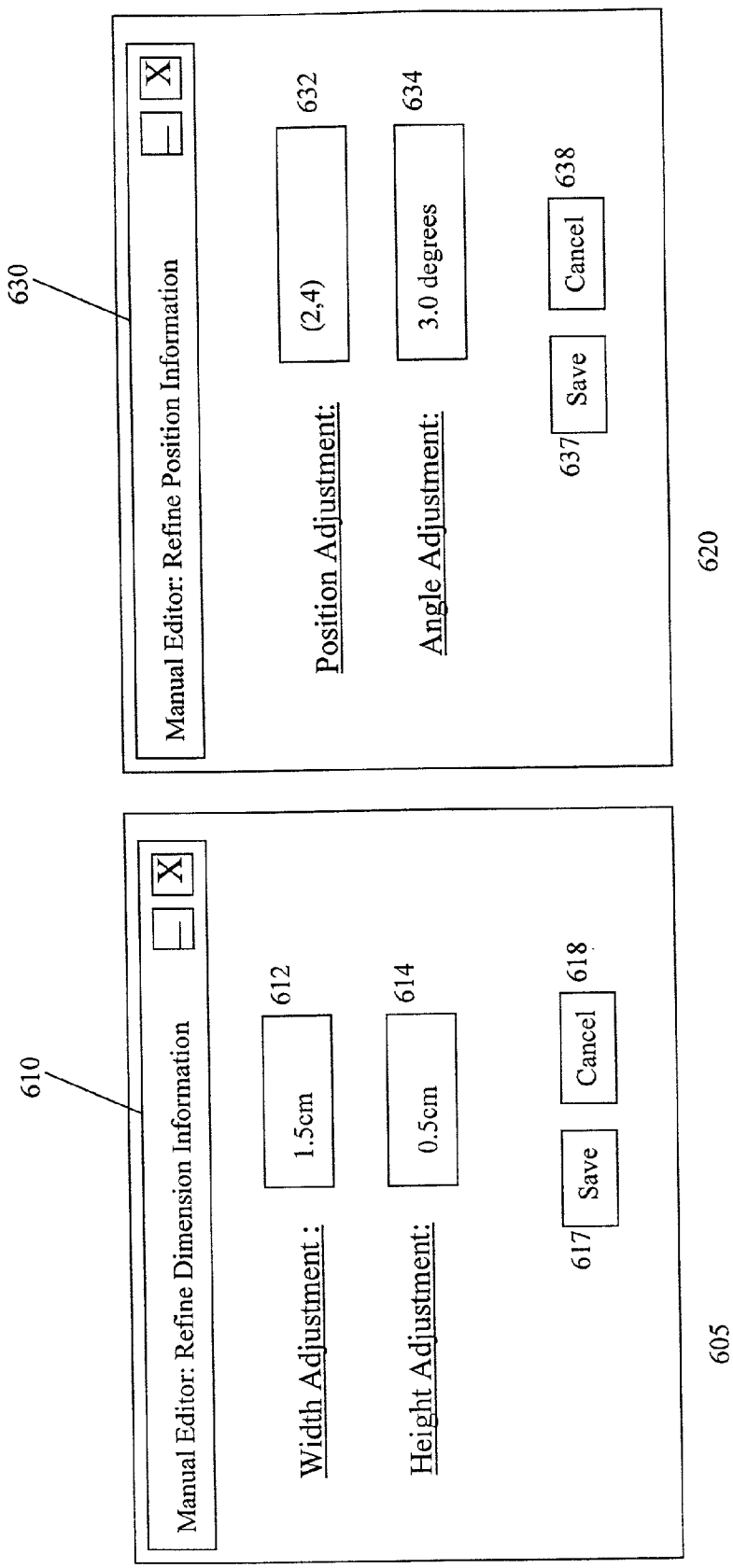
FIG. 6A illustrates exemplary manual editors.

Using manual refiner 530, a user may simply enter the corrections to the existing information. For example, corrections to the width and the height of a part of an object may be entered through dialog boxes on a user interface. FIG. 6A shows exemplary interfaces 605 and 620 that allow a user to enter the corrections to the dimension and the position information of an object part that is rectangular-shaped. On interface 605, a window 610 displays a message indicating that the corresponding interface is a manual editor for refining dimension information. Within interface 605, there may be two edit boxes 612 and 614 through which a user may manually enter that numerals that represent the adjustments to be made to the existing width and height information about a rectangular object part. The entered adjustments can be saved (so that the adjustments can take effect) by clicking on button 617. The entered adjustments may also be abandoned by simply clicking on button 618.

Similarly, interface 620 allows a user to refine the positional information of an object part, as indicated by the message in window 630. Edit boxes 632 and 634 are provided to allow a user to enter the adjustments (or corrections) to the existing position and orientation information. The adjustments will take effect when the user click on button 637 to save the corrections. The adjustments may also be abandoned if button 638 is clicked.

Figure 6B:
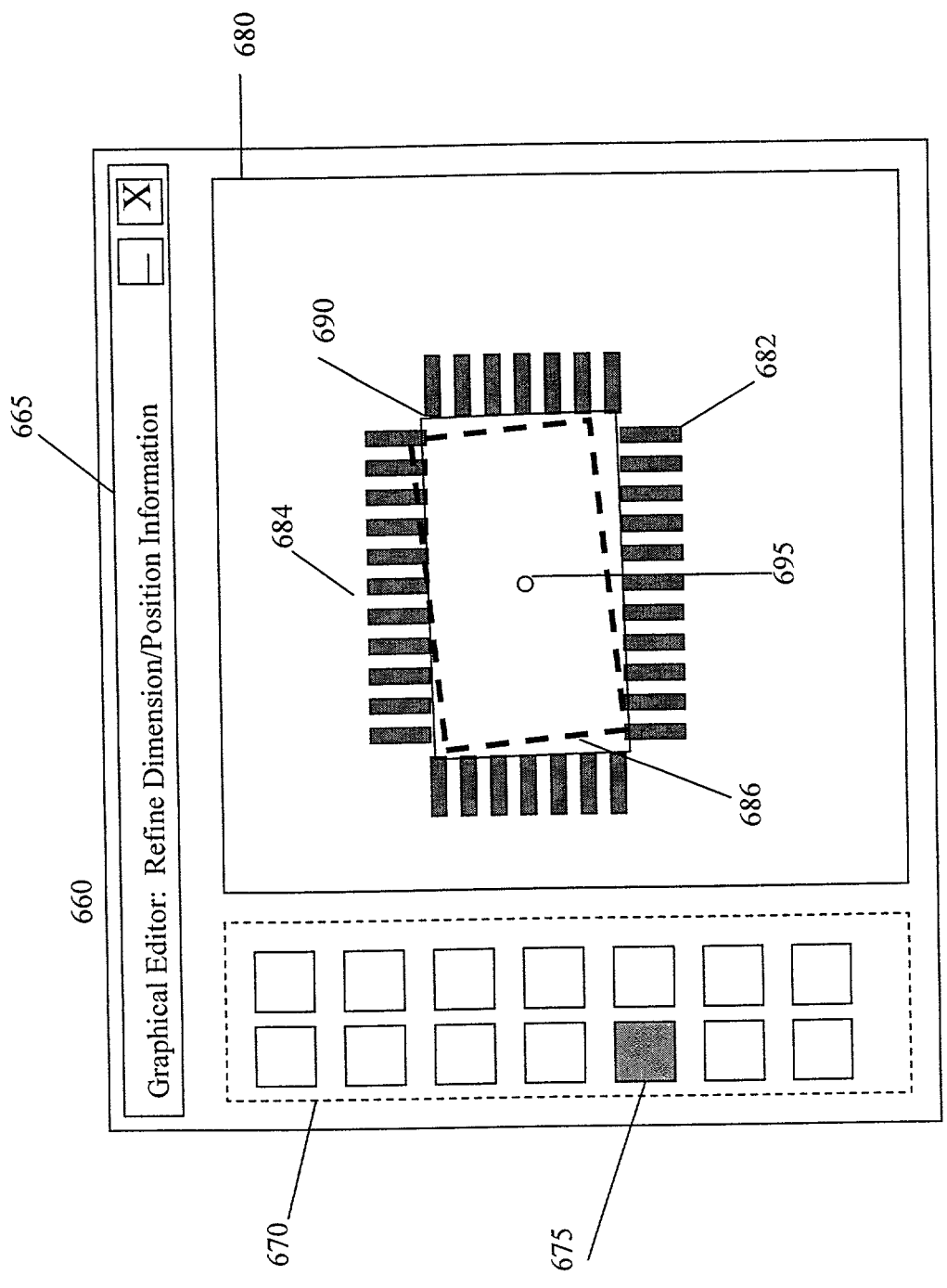
FIG. 6B illustrates exemplary graphical editors.

Refining a part model may also be achieved through a graphical means. FIG. 6B illustrates an exemplary graphical interface 660 for refining a rectangular part model by adjusting a drawing, directly on top of an image of the object to be modeled. In FIG. 6B, the information displayed in window 665 indicates that the corresponding interface represents a graphical editor for refining the dimension and position information of an object part model. Display window 680 is both where an image of the object to be modeled can be displayed and where a drawing can be adjusted. Section 670 represents a tool box, which may include a number of buttons, each of which represent a particular tool that can be used to manipulate a drawing. For example, button 675 may represent a tool that allows a user to rotate a rectangle in display window 680. Another possible tool may be a tool that allows a user to translate or move a rectangle in display window 680.

In FIG. 6B, rectangle 686 represents an SMD 684. Rectangle 686 may have been drawn using the graphical interface 445, as discussed earlier in referring to FIG. 4B. If rectangle 686 does not precisely coincide with SMD object 684, it can be refined graphically. As shown in FIG. 6B, the orientation of rectangle 686 does not match the orientation SMD object 684. In this case, the user may choose a tool to rotate a rectangle, by clicking on button 675, and then drag a corner of rectangle 686 to re-orient rectangle 686 so that it better aligns with object 684. For example, rectangle 690 may be the result of such re-orientation. The new orientation of the object may then be extracted from rectangle 690 to replace the existing orientation, and rectangle 690 may be used, in place of rectangle 686, to represent SMD 684.

Part model refinement may also be achieved through an automatic means. Such automatic tools typically snap the part model to the image of the object. Examples of automatically refining the body and leads of an SMD object are described in pending patents "Method for Refining Geometric Description Models Using Images" (application Ser. No. 09/127,676), herein incorporated by reference in its entirety, and "Methods and Apparatuses for Refining a Geometric Description of an Object Have a Plurality of Extensions" (application Ser. No. 09/203,182), herein incorporated by reference in its entirety.

Based on the part models generated for some or all the parts of an object, the model for the entire object can be created by object model generation unit 230. An object model may include geometric descriptions about an object. Such geometric descriptions are usually generated with respect to a reference coordinate system. Such a reference coordinate system is also very important to an inspection system because a machine vision inspection tool may report inspection results (e.g., alignment poses) and make relative measurements, all with respect to the reference coordinate system.

It is usually desirable for object model generation unit 230 to align the reference coordinate system with a chosen part of the object and to center the reference coordinate system properly with respect to the object so that the coordinate space transformation mathematics is simplified. The part chosen to be aligned against is a reference part.

Figure 7:
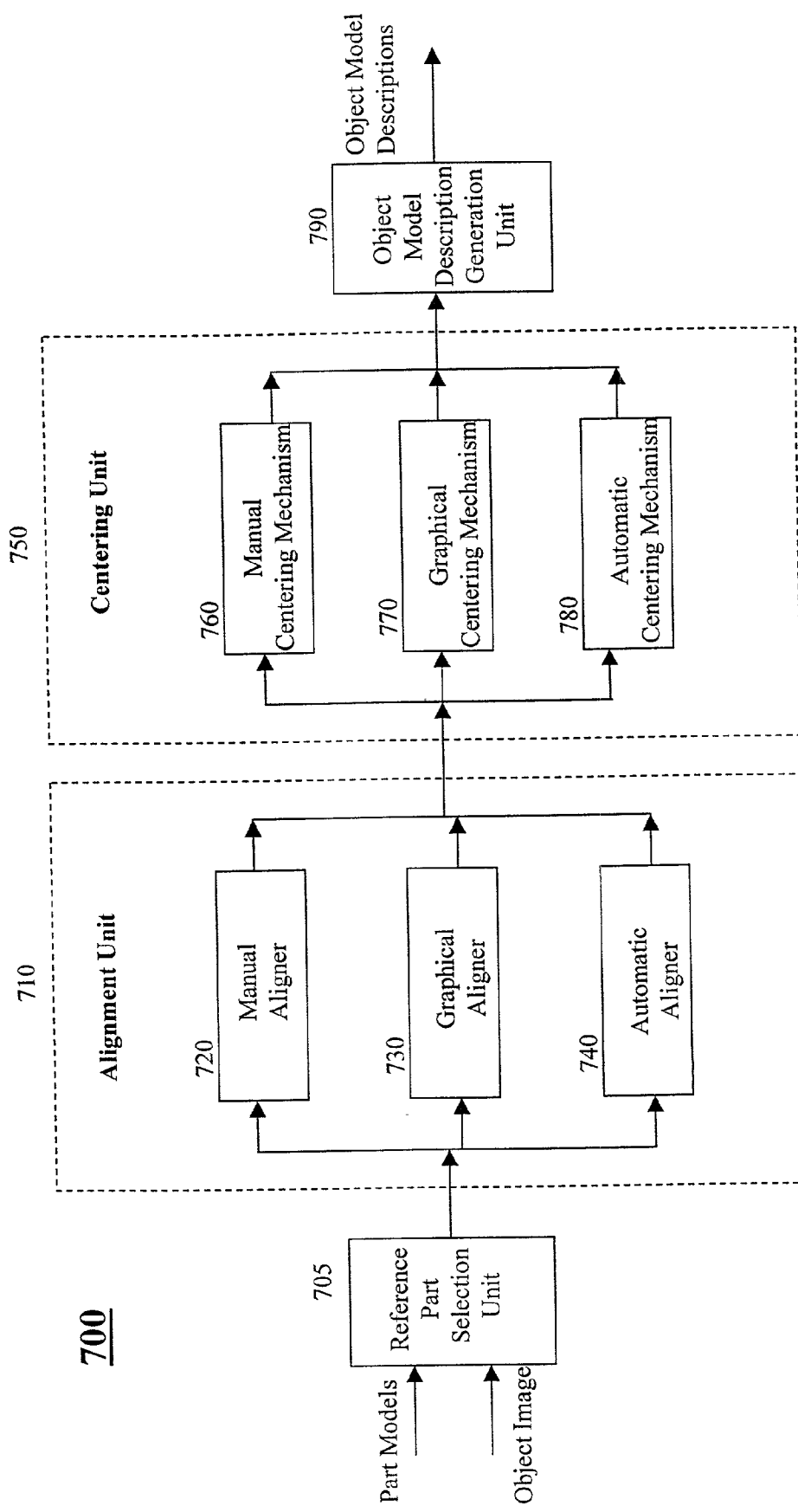
FIG. 7 is a high level block diagram of an object model generation mechanism.

FIG. 7 presents a high level block diagram 700 of object model generation unit 230. In FIG. 7, system 700 comprises a reference part selection unit 705, an alignment unit 710, a centering unit 750, and an object model description generation unit 790.

The first act to establish a coordinate system is to choose a reference. Such a reference includes an object part. That is, an object part is used as a reference to a coordinate system. For example, it is possible to align a coordinate system with a particular lead of a SMD. In FIG. 7, a reference of a coordinate system is determined through reference part selection unit 705. With a reference part selected, alignment unit 710 aligns a reference coordinate system with the reference part. Centering unit 750 then translates the aligned reference coordinate system to a proper location. One example of such a proper location may be the center of the object to be modeled. Both units 710 and 750 may use both the part models as well as the image of the object to be modeled.

Object model generation unit 230 may be realized by a combination of manual, graphical, and automatic tools, as depicted in FIG. 7. To establish a reference coordinate system, one or a combination of three aligners, a manual aligner 720, a graphical aligner 730, and an automatic aligner 740, may be used to align a coordinate system with a reference part. Similarly, to center a coordinate system, one or a combination of three centering mechanisms, a manual centering mechanism 760, a graphical centering mechanism 770, and an automatic centering mechanism, may be used to translate a coordinate system to a specified location. Alignment and centering may be performed independently using different tools. For example, it is possible to invoke manual aligner 720 first to manually align a reference coordinate system and then to invoke automatic centering mechanism 780 to automatically identify the center of an object, where the reference coordinate system is translated to.

The part model for the reference part, if available, may be used to assist alignment. For example, if a 2D reference coordinate system is to be aligned against a rectangular-shaped part (chosen as the reference part), the geometric description of the part, such as a rectangle, may define the orientation of 2D reference coordinate system. To manually align the 2D reference coordinate system in the orientation, extracted from the rectangle, a user may indicate, through an interface for manual aligner 720, which axis of the 2D reference coordinate system aligns with which side of the rectangle.

The alignment may also be performed through a graphical interface (not shown in FIG. 7B) for graphical aligner 730. Similar to interface 445 in FIG. 4B, a display window, similar to window 455, may be provided where the image of the object to be modeled can be displayed and drawings can be manipulated on top of the image. The reference part is also displayed in the image. Through such an interface, a user may simply drag and rotate the reference coordinate system so that it aligns with the reference part on top of the object image.

Automatic aligner 740 may also be applied to align a reference coordinate system with a reference part. In this case, aligner 740 automatically detects the precise location and the orientation of the reference part and then aligns the reference coordinate system in the detected orientation.

To center an aligned coordinate system, it is usually desirable to place the origin of the reference coordinate system at the center of mass of the object. To identify the center of mass of the object, different tools may be employed. FIG. 7 illustrates three exemplary possibilities. One is to manually identify the center. Through manual centering mechanism 760, the coordinate of the center of the object may be entered by a user. The center may be a 2D or a 3D coordinate, depending on whether the object to be modeled is a 2D or a 3D object. With a well-defined coordinates for the center, the aligned reference coordinate system is translated (moved) so that the origin of the reference coordinate system coincides with the coordinates of the center of the object.

Graphical centering mechanism 770 may provide a graphical means to center an aligned coordinate system. In this case, a user may simply drag the aligned coordinate system to the center of the object. Automatic centering mechanism 780 may make the centering easier by automatically detecting the center of mass of the object based on the object image and then automatically translating the aligned the reference coordinate system to the detected center location.

With a (properly aligned and properly centered) reference coordinate system, descriptions about the geometry of the object may be generated with respect to the reference coordinate system. This is performed by object model description generation unit 790. Such descriptions may include both the descriptions about the parts of the object as well as the descriptions about the spatial relationship among these parts.

Figure 8:
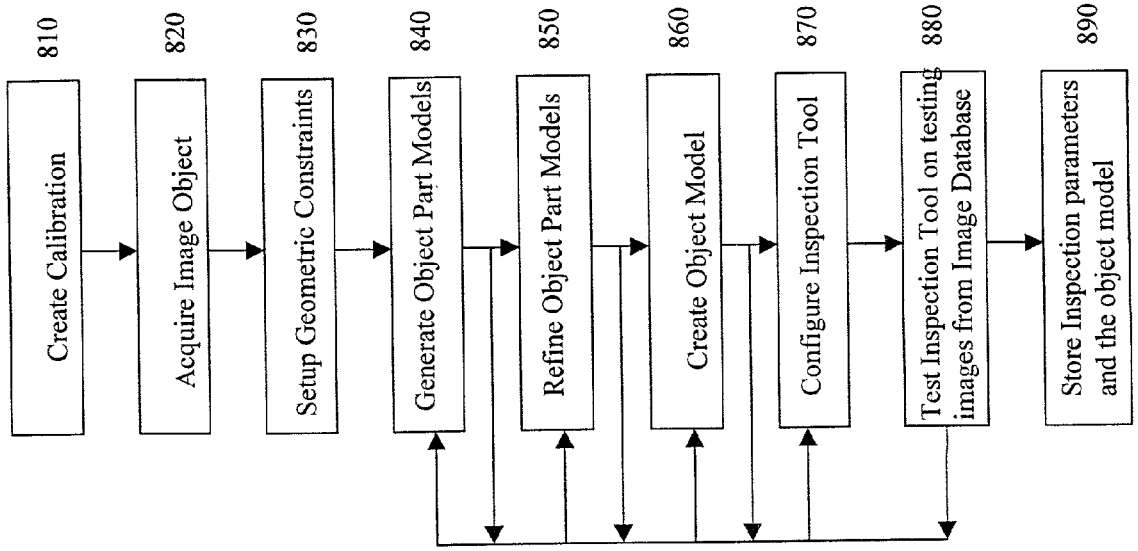
FIG. 8 is a flowchart of a process for creating geometric model descriptions.

With all the components in system 10 (FIG. 1) described so far, the process of generating a geometric object model may be controlled using different strategies. FIG. 8 presents a flowchart of an embodiment of the present invention that describes a generic process of generating a geometric object model from images. At act 810, a calibration is carried out. The calibration result is used in acquiring an image of the object to be modeled at act 820. Prior to generating part models from the image of the object, certain geometric constraints may be specified at act 830, and may be applied during generating part models of the object at act 840. The part models are generated directly from the image acquired at act 820. Act 840 may repeat itself until all the parts of the object have been modeled. Alternatively, it is also possible to refine some generated part models before all the parts of the object have been modeled. In this case, as depicted in FIG. 8, after the act at 840, act 850 is invoked that refines the part models that have been generated so far. Then more part models are generated, by returning to act 840 after act 850. The iteration between acts 840 and 850 may continue until all the parts have been modeled and refined.

Based on the part models, the model for the entire object is created at act 860, which includes establishing a reference coordinate system and generating the geometric descriptions about the object with respect to the reference coordinate system. Based on the object model (or geometric descriptions about the object) created at act 860, a machine vision inspection tool is configured at act 870. The configured tool is then used to perform testing inspection on one or more test images of the object at act 880.

An evaluation is also carried out at act 880, to determine whether the testing inspection yields satisfactory performance. A decision is then made based on the evaluation. If the performance is satisfactory, the object model generated is stored at act 890. If the performance is not satisfactory, (optionally) more causes (for failure of the model) may then be further identified. A cause may be used to determine which act or acts need to be repeated to obtain an improved performance.

As depicted in FIG. 8, it is possible to simply return to act 870 to reconfigure an inspection tool. It is also possible to return to act 860 to, for example, improve the alignment of the reference coordinate system. It is also possible to return to act 850 so that some part models may be refined further to improving the accuracy. It is also possible to return to act 840 so that some of the parts of the object, that, for one reason or another, have not been created, can be generated. By returning to an act, all the acts after that will be repeated. For example, returning back to act 850 from act 880 means that acts 850, 860, 870 and 880 will all be repeated.

Figure 9:
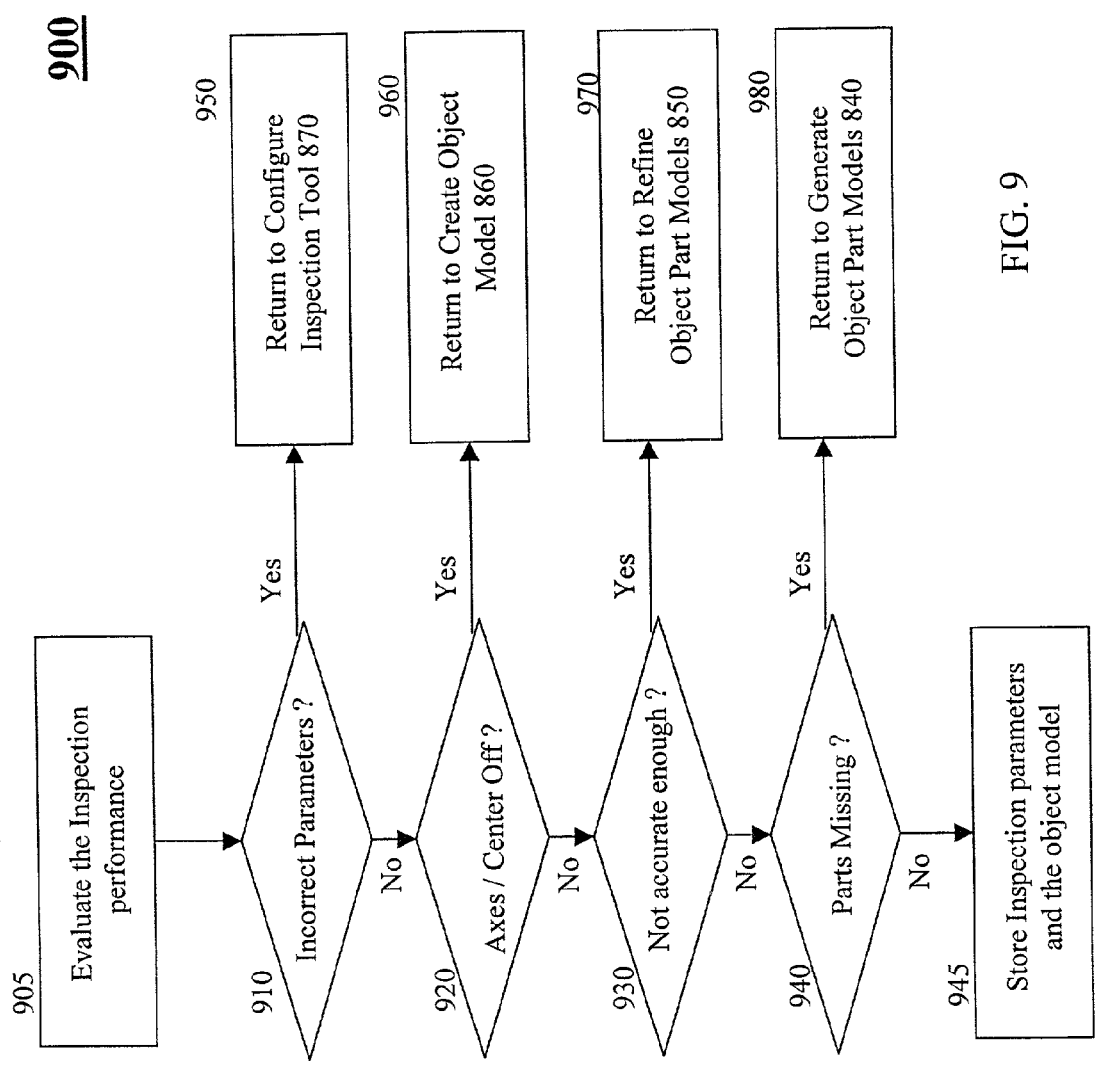
FIG. 9 is an exemplary flowchart showing the process of determining how to iteratively enhance a geometric model description.

FIG. 9 shows an exemplary approach to resolve the issue of which act or acts to iterate. At act 905, the test inspection performance is evaluated. As discussed earlier, such evaluation may be based on two sets of inspection measurements. One is the known inspection measurements, associated with the test images, and the other is the testing inspection measurements, produced by the testing inspection. The two sets may be compared, and an analysis based on the discrepancy of the two may be performed. FIG. 9 describes several exemplary outcomes of the analysis. If the configuration parameters (used to configure a test inspection tool) are not correct, determined at act 910, it may indicate that the configuration performed at act 870 yields an inspection tool that may not be proper for the testing inspection. In this case, it may be decided at act 950 to repeat all the acts starting from act 870 in FIG. 8.

If the configuration parameters are correct (determined at act 910), the accuracy of the axes of the reference coordinate system is examined at act 920. If the accuracy of the reference coordinate system is not satisfactory, it may be because the alignment or the centering is not performed to a degree of satisfaction at act 860. In this case, a decision is made at act 960 to repeat all the acts starting from act 860 in FIG. 8.

If the accuracy of the axes of the reference coordinate system is satisfactory, the accuracy of the part models for the object is examined at act 930. When the accuracy of the part models is not satisfactory, it may indicate that the part models are not accurate enough or the part refinement performed at act 850 did not produce accurate enough part models. In this case, a decision is made at act 970 to repeat all the acts starting from act 850 in FIG. 8.

The next examination at act 940 determines whether there is any part or parts of the object that have not been modeled. There may be different reasons for missing a part model. For example, if an automatic tool is used to generate part models, the automatic tool may not detect a part of the object from the image due to, for instance, poor resolution. If there is any part model missing, a decision may be made at act 980 to repeat all the acts in FIG. 8 starting from act 840. If no part model is missing, the object model generated so far may be considered satisfactory and be stored for future use.

As can be seen from FIG. 8 and FIG. 9, the object geometric model generation process described in the present invention may be an iterative process. The iteration, including how to iterate and how many times to iterate, is determined based on the evaluation on the testing inspection. The testing phase includes acts 870, 880, and 890 in FIG. 8. The acts before act 870 form a model creation phase. By coupling the model creation phase with the testing phase, the present invention ensures the quality of a created object model by applying the created object model in real applications and then refining the created model until its performance in real applications demonstrates its suitability for certain model-based inspection applications.

Figure 10:
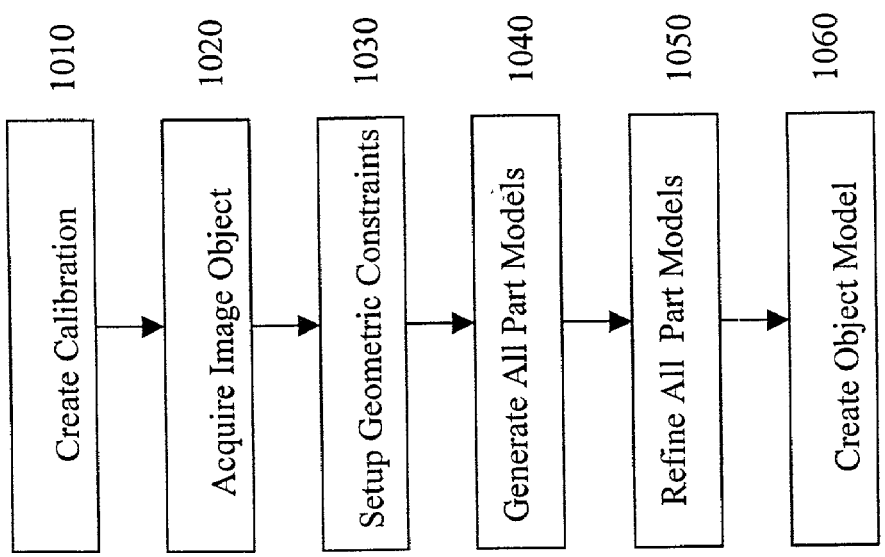
FIG. 10 is an exemplary flowchart showing one embodiment of the process of generating a geometric model description.

During the model creation phase (acts 810 to 860), there may be different strategies in terms of what to generate and in what order. FIG. 10 shows a flowchart that implements one exemplary embodiment of possible strategies. In FIG. 10, after an object image is acquired at act 1020 and geometric constraints are specified at act 1030, part models are generated for all the parts of the object at act 1040 before the part models can be refined at act 1050. Similarly, all the part models are refined before they can be used to create the model for the entire object at act 1060.

Figure 11:
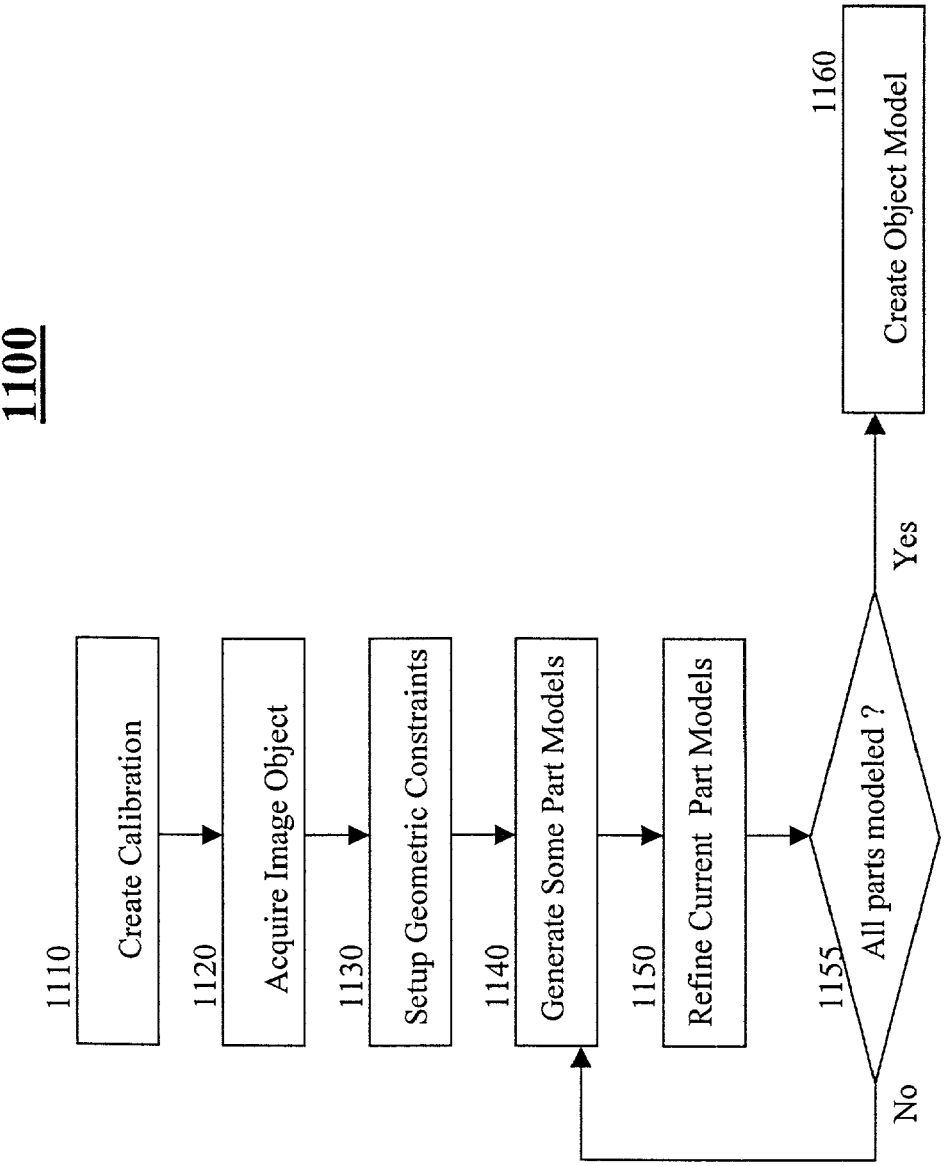
FIG. 11 is an exemplary flowchart showing a different embodiment of the process of generating a geometric model description.

A different embodiment for the model creation phase is illustrated in FIG. 11. After an image of an object is acquired at act 1120 and a set of geometric constraints are specified at act 1130, a loop between act 1140 and 1155 begins. At act 1140, part models for some of the parts of the object are generated during each iteration. The part models generated in one iteration may be refined at act 1150 in the same iteration. Acts 1140 and 1150 repeat until all the parts of the object are modeled.

One advantage of this embodiment is that generating and refining some of the part models in one iteration may enhance the part model generation in the next iteration. For example, referring to FIG. 1A, lead set 120 of SMD 100 may be modeled and refined in the first iteration (i.e., part models for all the leads in lead set 120 are generated and refined). That may help the second iteration of, for example, generating the part models for all the leads in lead set 125, to locate the leads of lead set 125, given that the geometric constraints (that the two lead sets form a 90 degree angle) may be made known to part modeling unit 220. The advantage may be particularly evident if automated tools are employed at act 1140 to generate part models. In this fashion, the part models generated in the next iteration may be more. When all the part models are generated, the model for the entire object is created in one shot, as depicted in FIG. 11.

FIG. 12 shows yet another different embodiment, in which a model for the entire object is also created in an iterative fashion. Similar to the embodiment depicted in FIG. 11, the part models are generated at acts 1230 and 1240 in an iterative fashion. In each iteration, with the part models generated so far, a model for the entire object is created at act 1245, based on the partial information about the parts of the object. When there are still parts to be modeled, acts 1230 and 1240 are iterated to generate more part models. With more part models available, act 1245 is iterated accordingly to create a different version of the model for the entire object.

Different versions of the model for the entire object may improve with the iteration because each new version of the object model generated in each iteration is based on more part models. In addition, each version of the object model created in a particular iteration may be used to enhance the part model generation and refinement at act 1230 and 1240 in the next iteration. This is because the alignment and centering results obtained at act 1245 in one iteration may help to locate parts of the object more precisely in the next iteration. In the last iteration of the embodiment illustrated in FIG. 12, the models for a last group of parts are generated at act 1230 and refined at act 1240. At act 1245 of this iteration, the models for all the parts of the object may be used to create a model for the entire object.

There may be more different strategies besides the three exemplary embodiments described in FIGS. 10, 11 and 12. For example, it is also possible to first create an initial model for the entire object even before the first part model is generated. In this manner, the search space for part model generation may be significantly reduced.

The invention may be implemented in hardware or a combination of hardware and software. The software may be recorded on a medium for reading into a computer memory and for executing. The medium may be, but is not limited to, for example, a floppy disk, a CD ROM, a writable CD, a Read Only Memory (ROM), and an Electrically Alterable Read Only Memory (EAPROM).

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method for creating a two-dimensional geometric object model describing the geometry of an object for use in machine vision inspection, said method comprising:
   acquiring a pixel image representation of an object;
   generating a set of two-dimensional geometric part models of said object based on said pixel image representation, said two-dimensional geometric part models corresponding to different respective parts of said object, said two-dimensional geometric object model comprising said set of two-dimensional geometric part models;
   obtaining a test image containing the visual appearance of said object and a given known inspection measurement associated with the test image;
   performing test inspection on said test image using said two-dimensional geometric object model to produce a testing inspection measurement; and
   retaining said two-dimensional geometric object model when said given testing inspection measurement deviates from said given known inspection measurement by an amount lower than a predetermined threshold.

2. The method of claim 1, further comprising:
   calibrating an image acquisition system to enable said acquiring to obtain calibrated said pixel image representation of said object; and
   specifying one or more constraints for said two-dimensional geometric object prior to said generating to provide additional information constraining said generating.

3. The method of claim 2, wherein said constraints include the geometric shape of said object.

4. The method of claim 2, wherein said constraints include the spatial relationship among different parts of said object.

5. The method of claim 1, said generating further comprising:
   determining the dimension of said part of said object; and
   determining the position of said part of said object.

6. The method of claim 1, wherein said two-dimensional geometric object model includes geometric descriptions expressed with respect to a coordinate system.

7. The method of claim 1, said generating further comprising:
   determining a coordinate system with respect to a specified reference; and
   generating said two-dimensional geometric object model with respect to said coordinate system.

8. The method of claim 1, further comprising:
   refining one or more of said two-dimensional geometric part models;
   configuring a machine vision inspection tool based on said two-dimensional geometric object model;
   evaluating the performance of said two-dimensional geometric object model by evaluating testing inspection measurements in relation to known inspection measurements to produce an indication that said two-dimensional geometric object model is one of satisfactory and unsatisfactory;

determining when said evaluating produces an indication of unsatisfactory, one or more causes that caused the unsatisfactory indication; and deciding an act to which to return for an iteration based on said cause, said act including said generating, said creating, said refining, and said configuring.

9. A system for creating a two-dimensional geometric object model describing the geometry of an object for use in machine vision inspection, said system comprising:

an image acquisition system to acquire a pixel image representation of an object;

a generator to generate two-dimensional geometric part models of said object based on said pixel image representation, said two-dimensional geometric part models corresponding to different respective parts of said object, a said two-dimensional geometric object model comprising said part models;

an image storage mechanism to store a test image and a given known inspection measurement associated with said test image;

a testing unit to perform machine vision inspection on said test image using said two-dimensional geometric object model to produce a testing inspection measurement; and an object model storage mechanism to retain said two-dimensional geometric object model when said testing inspection measurement deviates from said given known inspection measurement by an amount lower than a predetermined threshold.

10. The system of claim 9, further comprising:

a calibration unit to calibrate an image acquisition system to enable said calibration unit to obtain calibrated said pixel image representation of said object; and a constraint set up unit to specify one or more constraints for said object to provide additional information constraining said generator.

11. The system of claim 10, wherein said constraints include the geometric shape of said object.

12. The system of claim 10, wherein said constraints include the spatial relationship among different parts of said object.

13. The system of claim 9, said generator further comprising:

a first determiner to determine the dimension of said part of said object; and a second determiner to determine the position of said part of said object.

14. The system of claim 9, wherein said two-dimensional geometric object model includes geometric descriptions expressed with respect to a coordinate system.

15. The system of claim 9, said generator further comprising:

a determiner to determine a coordinate system with respect to a specified reference; and a generator to generate said two-dimensional geometric object model with respect to said coordinate system.

16. The system of claim 9, further comprising:

a refiner to refine one or more of said two-dimensional geometric part models;

a configuration unit that configures a machine vision inspection tool based on said two-dimensional geometric object model; and an evaluation unit to evaluate the performance of said two-dimensional geometric object model by evaluating testing inspection measurement in relation to known inspection measurement to produce an indication that said two-dimensional geometric object model is one of satisfactory and unsatisfactory;

a determiner to determine when said evaluation unit yields an indication of unsatisfactory, one or more causes that caused the unsatisfactory indication; and a decider to decide an act to which to return for an iteration based on said cause, said act including steps performed by said generator, by said creator, by said refiner, and by said configuration unit.

17. A medium having information recorded thereon, such that when said information is read and executed by a computer, the computer is caused to:

acquire a pixel image representation of an object;

generate two-dimensional geometric part models of an object based on said pixel image representation, said two-dimensional geometric part models corresponding to different respective parts of said object, said two-dimensional geometric object model comprising said two-dimensional geometric part models;

obtain a test image, containing the visual appearance of said object, and a given known inspection measurement associated with said test image;

perform test inspection on said test image using said two-dimensional geometric object model to produce a testing inspection measurement; and retain said two-dimensional geometric object model when said test inspection measurement deviates from said given known inspection measurement by an amount lower than a predetermined threshold.

18. The medium of claim 17, said information recorded on said medium further causes said computer to:

calibrate an image acquisition system to enable said acquiring to obtain calibrated said pixel image representation of said object; and specify one or more constraints for said object prior to said generating to provide additional information constraining said generating.

19. The medium of claim 18, wherein said constraints include the geometric shape of said object.

20. The medium of claim 18, wherein said constraints include the spatial relationship among different parts of said object.

21. The medium of claim 17, wherein said information recorded on said medium further causes said computer to:

determine the dimension of said part of said object; and determine the position of said part of said object.

22. The medium of claim 17, wherein said two-dimensional geometric object model includes geometric descriptions expressed with respect to a coordinate system.

23. The medium of claim 17, wherein said information recorded on said medium further causes said computer to:

determine a coordinate system with respect to a specified reference; and generate said two-dimensional geometric object model with respect to said coordinate system.

24. The medium of claim 17, said information recorded on said medium further causes said computer to:

refine one or more of said two-dimensional geometric part models;

configure a machine vision inspection tool based on said two-dimensional geometric object model;

evaluate the performance of said two-dimensional geometric object model by evaluating testing inspection measurement in relation to known inspection measurement to produce an indication that said object model is one of satisfactory and unsatisfactory;

determine when said evaluating produces an indication of unsatisfactory, one or more causes that caused the unsatisfactory indication; and decide an act to which to return for an iteration based on said cause, said act including said generating, said creating, said refining, and said configuring.

* * * * *